(12) United States Patent
Tong et al.

(10) Patent No.: US 7,654,040 B2
(45) Date of Patent: Feb. 2, 2010

(54) UNLOCK MECHANISM FOR A ROTARY DOOR OPERATOR

(75) Inventors: Haibo Tong, Palapine, IN (US); Marianne Krbec, Elmhurst, IL (US)

(73) Assignee: Wabtec Holding Corp., Wilmerding, PA (US)

( * ) Notice: Subject to any disclaimer, the term of this patent is extended or adjusted under 35 U.S.C. 154(b) by 0 days.

(21) Appl. No.: 11/784,953

(22) Filed: Apr. 10, 2007

(65) Prior Publication Data

US 2007/0214724 A1 Sep. 20, 2007

Related U.S. Application Data

(62) Division of application No. 10/744,038, filed on Dec. 23, 2003, now Pat. No. 7,210,268.

(51) Int. Cl.
*E05F 7/02* (2006.01)
(52) U.S. Cl. .............................. 49/255; 49/280; 49/281
(58) Field of Classification Search .................. 49/255, 49/280, 254, 334, 281, 286
See application file for complete search history.

(56) References Cited

U.S. PATENT DOCUMENTS

| 4,087,939 | A |  | 5/1978 | Elguindy et al. |
| 4,545,149 | A |  | 10/1985 | Jentsch |
| 4,731,886 | A | * | 3/1988 | Heinrich et al. ............... 49/334 |
| 4,833,827 | A |  | 5/1989 | Bode et al. |
| 4,854,223 | A |  | 8/1989 | Fink |
| 6,948,765 | B2 |  | 9/2005 | Tong et al. |
| 7,017,974 | B2 |  | 3/2006 | Tong et al. |
| 7,210,268 | B2 | * | 5/2007 | Tong et al ..................... 49/255 |

FOREIGN PATENT DOCUMENTS

| DE | 34 00 753 A1 | 8/1984 |
| GB | 2 014 231 A | 8/1979 |

\* cited by examiner

*Primary Examiner*—Gregory J. Strimbu
(74) *Attorney, Agent, or Firm*—The Webb Law Firm

(57) ABSTRACT

An unlock mechanism for a rotary door operator of a transit vehicle includes a pivotally disposed lock member adapted for rotating into an unlock position and activating a valve for discharging the fluid pressure from a drive cylinder to enable a manual opening of the door. A spring is provided for biasing the lock member into a lock position. The lock member may be moved into the unlock position either with a cable or a lever handle.

6 Claims, 6 Drawing Sheets

UNLOCK MECHANISM FOR A ROTARY DOOR OPERATOR

CROSS REFERENCE TO RELATED APPLICATIONS

This application is a divisional of U.S. patent application Ser. No. 10/744,038 filed Dec. 23, 2003, now U.S. Pat. No. 7,210,268.

BACKGROUND OF THE INVENTION

1. Field of the Invention

The present invention relates, in general, to transit vehicle door systems and, more particularly, the instant invention relates to a rotary door operator and, yet more particularly, the instant invention relates to a rotary door operator having a "zero-lead" or a "lift-and-lock" locking feature.

2. Description of Related Art

Prior to the development of the present invention, as is generally well known in the art, a rotary door operator is mainly used in the inter-city bus coaches. These rotary operators are available in two distinct types, commonly referred to as zero-lead and lift-and-lock. Either door operator type can be adapted for use with pneumatic or hydraulic fluids.

The rotary door operator of the zero-lead type converts piston motion of a piston-power cylinder unit into a rotary motion by means of roller pairs engaging oblique slots with an axial direction at their ends. One of the cylinders within the piston-power cylinder unit is connected to the power output shaft which, in turn, is connected to a door of the vehicle. During the door closing cycle, the output shaft moves upwardly in the vertical direction. When the door reaches a closed position, the roller pairs disposed at the end of the axial portions provide rudimentary locking of the door providing that the piston-power cylinder unit is charged with fluid and that no leakage occurs.

The rotary door operator of the lift-and-lock type comprises a double acting drive cylinder driving an output shaft coupled to the door post. The output shaft has a splined shaft member connected to the drive cylinder through a helical ball cage in order to provide a rotary motion and engageable with the door post carrying the door. The output shaft also has an antirotational shaft member enabling vertical movement of the output shaft to lock and unlock the door. When the door reaches the closed position, the rotary door operator lifts the door post and, subsequently, the door connected to the door post by approximately 10 mm, enabling door mounted wedges to engage mating wedges mounted adjacent a portal aperture of the transit vehicle. In the opening direction the output shaft first moves in a downward direction disengaging the wedges and enabling rotation of the door post.

To close the transit vehicle door, the cylinder is charged with fluid pressure through the first orifice. The rate at which the door closes depends solely on the rate at which the cylinder is charged with fluid. The splined shaft member connected with a drive cylinder piston moves linearly in the upward direction while engaging an antirotational shaft member. Such upward motion of the output shaft causes rotation of the post in the first direction and, more particularly, causes the closing motion of the door.

To open the transit vehicle doors, the drive cylinder is charged with fluid pressure through the second orifice. The rate at which the door opens depends solely on the rate at which the cylinder is charged with air. The output shaft moves linearly in the downward direction and causes rotation of the splined shaft in the second direction to open the door.

Such lift-and-lock feature is the mechanism disposed within the door operator preventing the un-locking of the door. When such door contacts door jambs of the door portal aperture, the mounting linkage attached to the door at one end and attached to such door operator at the distal end stops rotating. Since the drive cylinder has not reached the end of the stroke, the output shaft continues to move upward lifting such door and enabling door locking wedges to substantially engage mating locking wedges disposed adjacent the portal aperture.

One of the main disadvantages of these designs is that loss of fluid pressure will cause downward movement of the door, thus disengaging such mating wedges in lift-and-lock applications or simply unlock the door in zero-lead applications and, more particularly, the loss of fluid pressure will create a hazardous condition due to an unlocked door.

To overcome the aforementioned concern associated with fluid pressure loss, lock mechanisms have been employed in such rotary door operators.

U.S. Pat. No. 4,545,149 to Jentsch teaches a lock mechanism for a lift-and-lock door operator type. Such lock mechanism employs a support member positioned under a disk that is permanently attached to the output shaft and an unlocking member, which engages such support to prevent its rotation in the unlocking direction. In the door locked position, the disk rests on the support member thus preventing downward movement of the output shaft. The support member incorporates adjustment means to maintain a contact with the disk. The unlocking member is connected to a unlock cylinder. To unlock the door in a normal operation, the unlock cylinder is energized causing rotation of the unlocking member which enables the support member to rotate in the unlocking direction and, more particularly, enables the output shaft to move downwardly and disengage the door wedges.

Manual unlocking of the door is achieved via Bowden cable that is attached to the unlocking member. In addition the Bowden cable is attached, through a plurality of linkages, to a fluid-evacuation valve which must be opened in order to evacuate fluid pressure from the unlock cylinder. Such Bowden cable is routed from the bottom of the rotary operator to rotate unlocking lever in the clockwise direction to unlock the door.

There are several disadvantages related to this type of lock mechanism. In the first aspect, the disk rests on the support member creating a frictional force that must be overcome during door unlocking movement. In the second aspect, the engagement between support member and the unlocking member, as best understood, creates an additional frictional force. As it is well known in the art, frictional forces cause premature wear and reduce reliability of the design. In the third aspect, manual unlocking of the door incorporates additional linkage to open a fluid pressure evacuation valve which further increases the complexity of the design. In the fourth aspect, the Bowden cable must be routed from the bottom portion of the door in order to enable clockwise rotation of the unlocking lever.

U.S. Pat. No. 4,854,223 to Fink teaches a lock mechanism for zero-lead rotary door operator. Such lock mechanism utilizes a blocking lever to block downward movement of the roller pair only when fluid pressure loss occurs. The blocking lever is connected to the spring loaded rod of the lock cylinder. In normal operation, the lock cylinder is charged at all times to maintain the blocking lever in the unlock position additionally compressing its internally mounted spring.

Manual unlocking of the door is achieved via Bowden cable connected to the blocking lever at one end and connected to a lever at a distal end. The lever is employed to activate a three-way valve in order to remove the fluid pressure from the line and open the door via the Bowden cable. The Bowden cable is also routed from the bottom portion of the door in order to provide a desired rotation of the blocking lever. As best understood, the three-way valve is mounted remotely from the rotary door operator.

As it is well known in the art, routing of the Bowden type cable, typically incorporated into a structure of the transit vehicle, requires special mounting and guiding considerations so not to provide for possibility of cable damage and at the same time assure proper cable operation. Of a particular concern is a guiding and mounting of the cable in a close proximity near its end engageable with the locking/unlocking levers. As best understood, the prior art designs do not provide for such guiding and mounting means integral to the rotary door operator.

As it can be seen from the above discussion there is a need for a relatively simple, reliable and versatile manual unlock mechanism for a rotary door operator.

SUMMARY OF THE INVENTION

An unlock mechanism for a rotary door operator of a transit vehicle is provided for manual opening of the door in case of an emergency or for operational and maintenance purposes when fluid pressure supply is not available. It consists of an unlock member pivotally disposed within the rotary door operator for rotating a lock member in an unlocking direction and for activating a valve or a switch to discharge fluid pressure from the drive cylinder of the rotary door operator thus enabling downward movement of the output shaft to unlock the door and further enabling a manual rotation of the door in an opening direction. A spring is provided for biasing the unlock member in a non-actuated position during normal operation. The unlock member is adapted for coupling either to the cable which is routed within the structure of the transit vehicle or to a handle which extends beyond a cover of the rotary door operator. A guiding means is provided for securing the cable near its final termination at the unlock member. A lock sensing switch provides a feedback of the lock condition to the transit vehicle control system.

It is, therefore, one of the primary objects of the present invention to provide a simple and reliable unlock mechanism for a rotary door operator.

It is another object of the present invention to provide an unlock mechanism for a rotary door operator which incorporates both lever and cable attachment provisions.

It is a further object of the present invention to provide an unlock mechanism for a rotary door operator which incorporates cable guiding and mounting provisions.

It is an additional object of the present invention to provide an unlock mechanism for a rotary door operator which provides for bi-directional cable routing.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

BRIEF DESCRIPTION OF THE DRAWING(S)

DESCRIPTION OF THE PREFERRED EMBODIMENT(S)

Figure 1:
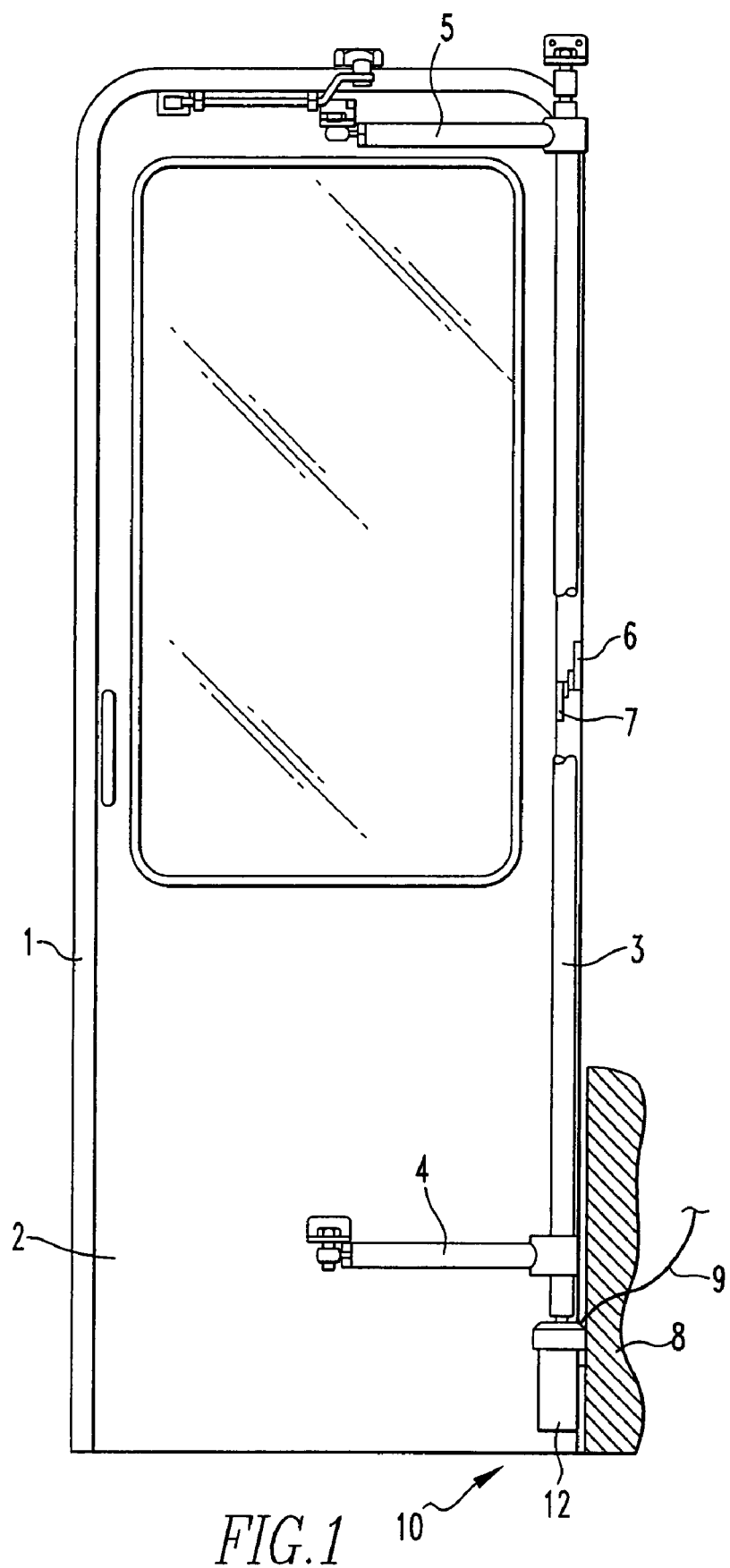
FIG. 1 is a plan view of a typical door system utilizing a rotary door operator.

Before describing the invention in detail, the reader is advised that, for the sake of clarity and understanding, identical components having identical functions have been marked where possible with the same reference numerals in each of the figures provided in this document.

The invention disclosed herein overcomes unlocking device application difficulties through the use of an unlock member adapted for activating an unlock valve to evacuate fluid pressure from the drive cylinder and simultaneously rotating a lock member to the unlocked position for enabling a downward movement of the output shaft. The use of a simple unlock member eliminates the need for multiple and more complex moving components. An additional advantage of the present invention is that the unlock member is adapted for coupling to at least one cable or a lever arm.

For the sake of brevity, the structure and operation of the unlock mechanism will be described in application with the lift-and-lock rotary door operator. Those skilled in the art will readily understand that the operation of the unlock mechanism in combination with a zero-lead rotary door operator will be identical except for the amount of vertical shaft movement prior to and after the door post rotation and further in a method of achieving rotary and axial motion related to the internal components of the rotary drive operator.

Figure 2:
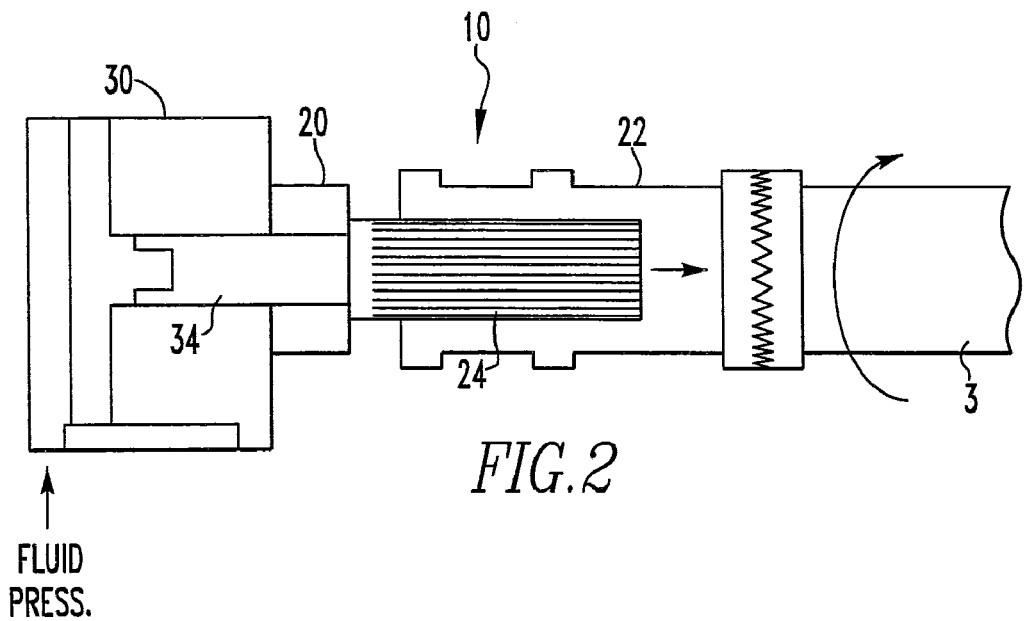
FIG. 2 is a diagrammatic view of the rotary door operator.

The reader's attention is directed to FIGS. 1 and 2, wherein is illustrated a typical door system which utilizes a rotary door operator, generally designated 10. Such door system typically comprises a door 2 disposed within a portal aperture 1 of a transit vehicle (not shown). The door 2 is supported by first and second arms 4 and 5 respectively which are attached to a well known door post 3. The door post 3 is pivotally attached to a transit vehicle structure 8 at one end and pivotally attached to the rotary door operator 10 at a distal end. Such rotary door operator 10 enables a rotation of the door post 3 and further enables a movement of the door 2 in a closing and an opening direction. A stationary wedge element 6 attached to the transit vehicle structure 8 and a movable wedge element 7 attached to the door 2 and engaging such stationary wedge element 6 are provided for locking the door 2 in a closed position.

Figure 5:
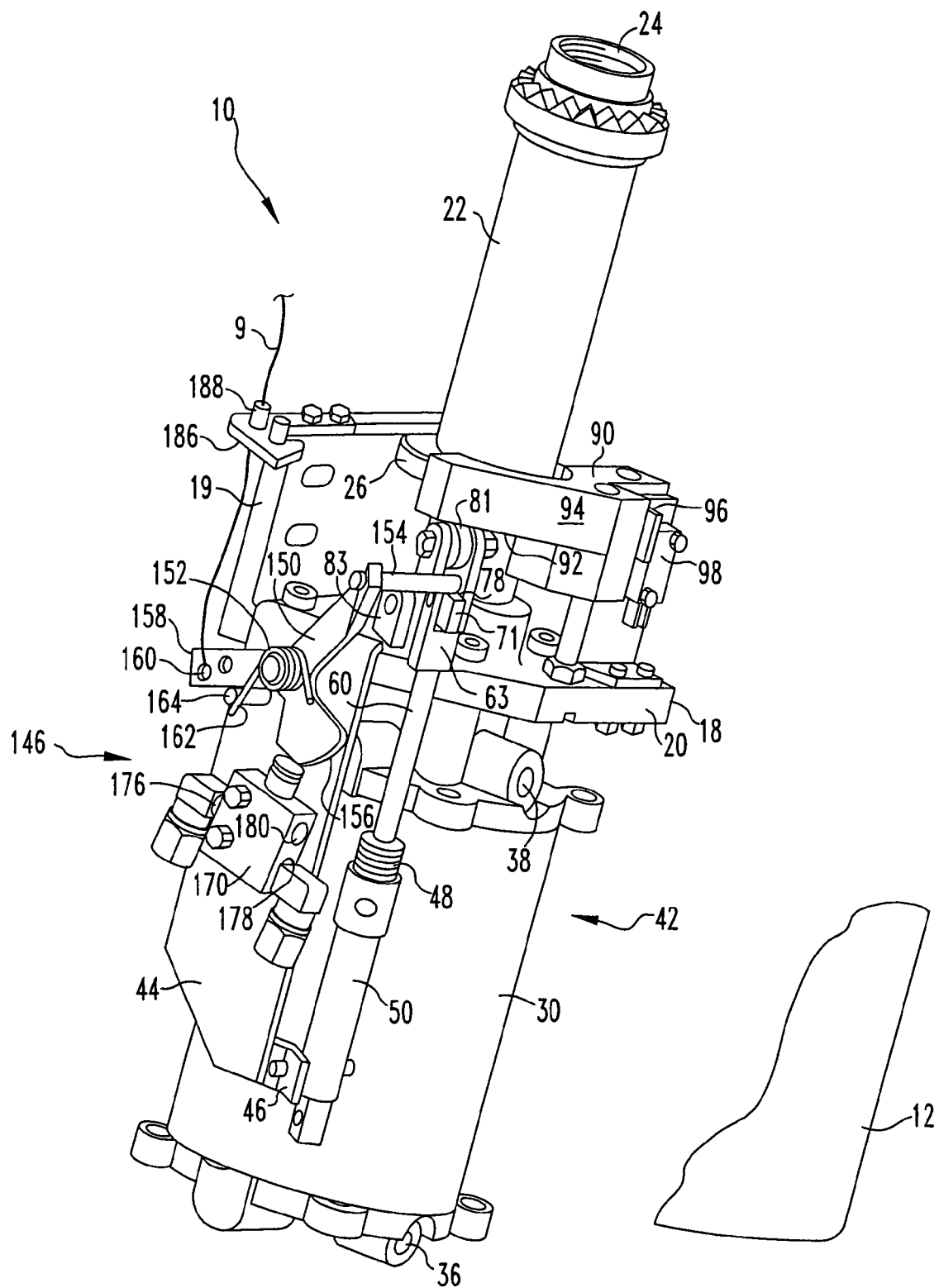
FIG. 5 is a perspective view of the unlock mechanism, according to the presently preferred embodiment of the present invention.

The rotary door operator 10, best illustrated in FIGS. 2 and 5, comprises an operator mounting bracket 18 (FIG. 5) having a first surface portion 19 (FIG. 5) for attachment thereof to the transit vehicle structure 8 (FIG. 1). A drive cylinder 30 is attached to such operator mounting bracket 18 at a second surface portion 20 thereof. A piston rod 34 is adapted for reciprocal motion within the drive cylinder 30. First and second adjustable restricted orifices 36 and 38 (FIG. 5), respectively, are provided for supplying and evacuating fluid pressure to and from the drive cylinder 30 to enable closing and opening of door 2. An output shaft 22 is connected to the door post 3. A splined shaft member 24 is engaged with the output shaft 22 at one end and is connected to the piston shaft 34 (FIG. 2) at a distal end. A cover 12 (FIG. 5) is generally provided to enclose the rotary door operator 10 for safety to passengers and for aesthetic purposes.

The lock mechanism, generally designated 40 (FIG. 3), 41 (FIG. 4) or 42 (FIG. 5), is best illustrated in FIG. 5. Such lock mechanism 42 (FIG. 5) includes a first abutment means 26 secured to the output shaft 22 for axial movement therewith and a first spring-biased (see 64 in FIG. 6) blocking means 50 adapted for blocking the axial linear movement of the first abutment means 26 during the loss of the fluid pressure 100 to the drive cylinder 30.

In the presently preferred embodiment of FIG. 5 such first blocking means 50 is a cylinder 50 attached at mounting portion 46 of a mounting member 44 which is in turn attached to the second surface portion 20 of the mounting bracket 18. The cylinder 50 includes a guide 48 encasing a shaft 60 which is attached to a piston 52 disposed in the cylinder 50.

Alternatively, such cylindrical blocking means 50 and mounting member 44 may be attached to the transit vehicle structure 8 or to the first surface portion 19 of the mounting bracket 18.

In an alternative embodiment such first blocking means 50 is an electrical solenoid having a solenoid shaft 60 attached to the blocking member 62 and a first biasing means 64 (see FIG. 6) urging the solenoid shaft 60 in the locking position. Those skilled in the art will understand that the solenoid shaft 60 will function equivalently to the fluid-activated shaft 60 of the preferred embodiment of FIG. 5. Such first biasing means 64 is preferably a bias spring 64.

Figure 4:
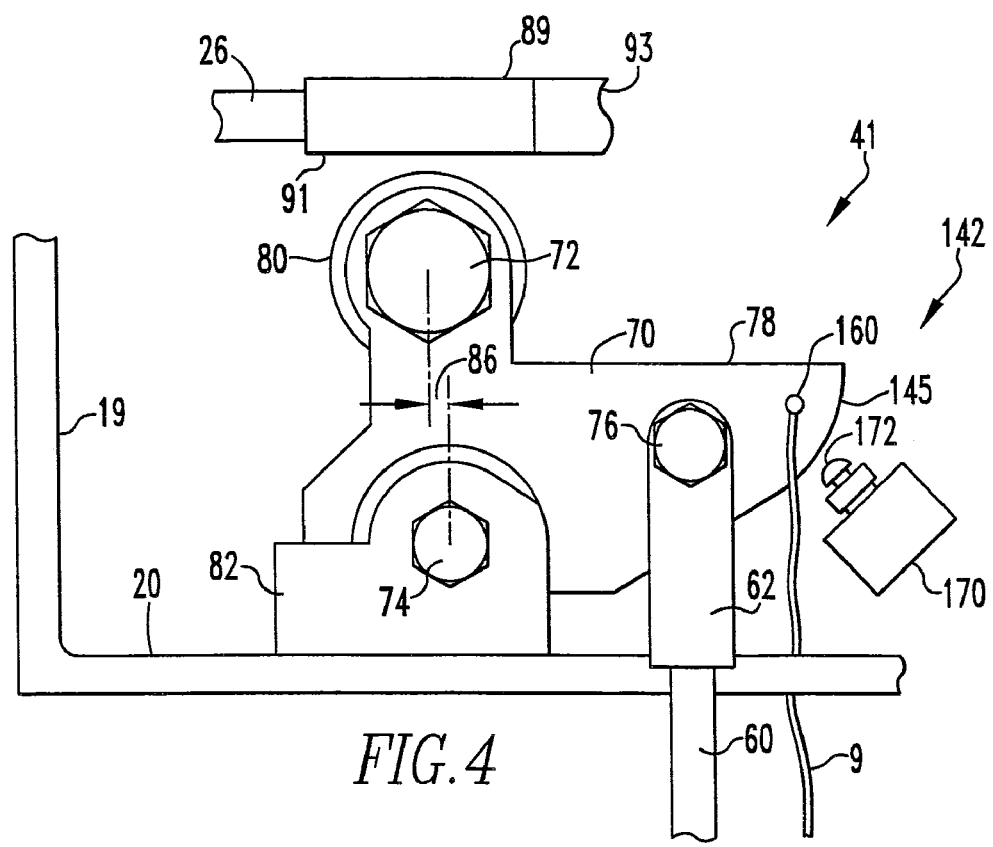
FIG. 4 is a side elevation view showing another embodiment of the unlock mechanism of the present invention.

In the embodiments illustrated in FIGS. 4 and 5, the lock mechanism 41 (FIG. 4) and 42 (FIG. 5) comprises a second blocking means 70 (FIG. 4) and 71 (FIG. 5) and a second abutment member 90. The second blocking means is pivotally attached to at least one mounting tab 82 (FIG. 4), 83 (FIG. 5) at a second pivot 74 (FIG. 4) and pivotally attached to the blocking member 62 (FIG. 4), 63 (FIG. 5) at a third pivot 76. The at least one mounting tab 82 (FIG. 4), 83 (FIG. 5) may be integral to the mounting member 44 but preferably is integral to the second surface portion 20 of the mounting bracket 18. As best illustrated in FIG. 4, the first pivot 72 and a second pivot 74 are spaced in respect to the vertical axis by a second predetermined distance 86 to form what is well known as an overcenter locking condition. In this condition the unintended downward movement of the output shaft 22 would prevent rotation of the second blocking means 70 in the unlocking direction and, more importantly, would prevent unintended unlocking of the door 2.

The second abutment means 89 (FIG. 4), 90 (FIG. 5) includes a first surface 91 (FIG. 4), 92 (FIG. 5) and an adjacently disposed second surface 93 (FIG. 4), 94 (FIG. 5). The first surface maintains the second blocking means 70 or 71 in the unlocking position during door 2 opening. A third surface 96 (FIG. 5) may be provided for engaging at least one electrical switch 98 (FIG. 5) for feedback of the lock condition to a control system of the transit vehicle.

A friction reducing means coupled to the second blocking means 70 or 71 is provided to minimize friction upon engagement and disengagement thereof with the second abutment means 89 or 90. In the presently preferred embodiment such friction reducing means is a metallic roller 80 (FIG. 4), 81 (FIG. 5) attached to the second blocking means 70 or 71 at a first pivot 72. Alternatively, such friction reducing means can be a simple polymer roller or a surface portion of the second blocking means around the first pivot which is coated with friction reducing materials including but not limited to Teflon (polytetrafluoroethelyne) and nylon.

Figure 3:
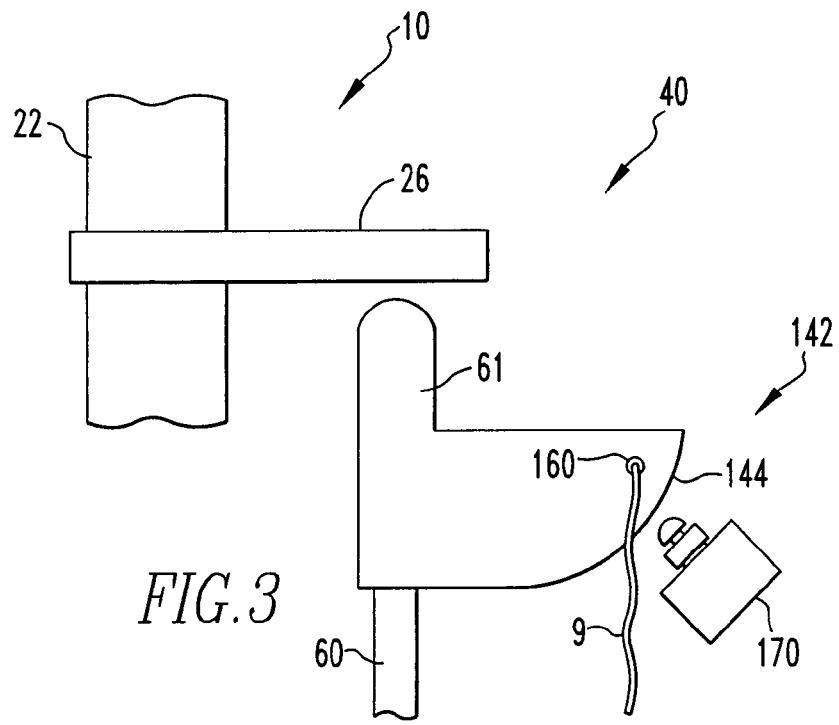
FIG. 3 is a side elevation view showing a first embodiment of the unlock mechanism of the present invention.

The unlock mechanism, generally designated 142, of the embodiment as best illustrated in FIG. 3 comprises at least one actuation portion 144 disposed within the blocking member 61 and a fluid pressure interruption means 170, which is preferably attached to the mounting member 44. The blocking member 61 is further adapted with at least one attachment means 160 for securing an end of a cable 9 adapted within the transit vehicle structure 8 for initiating manual opening of the door 2.

Figure 6:
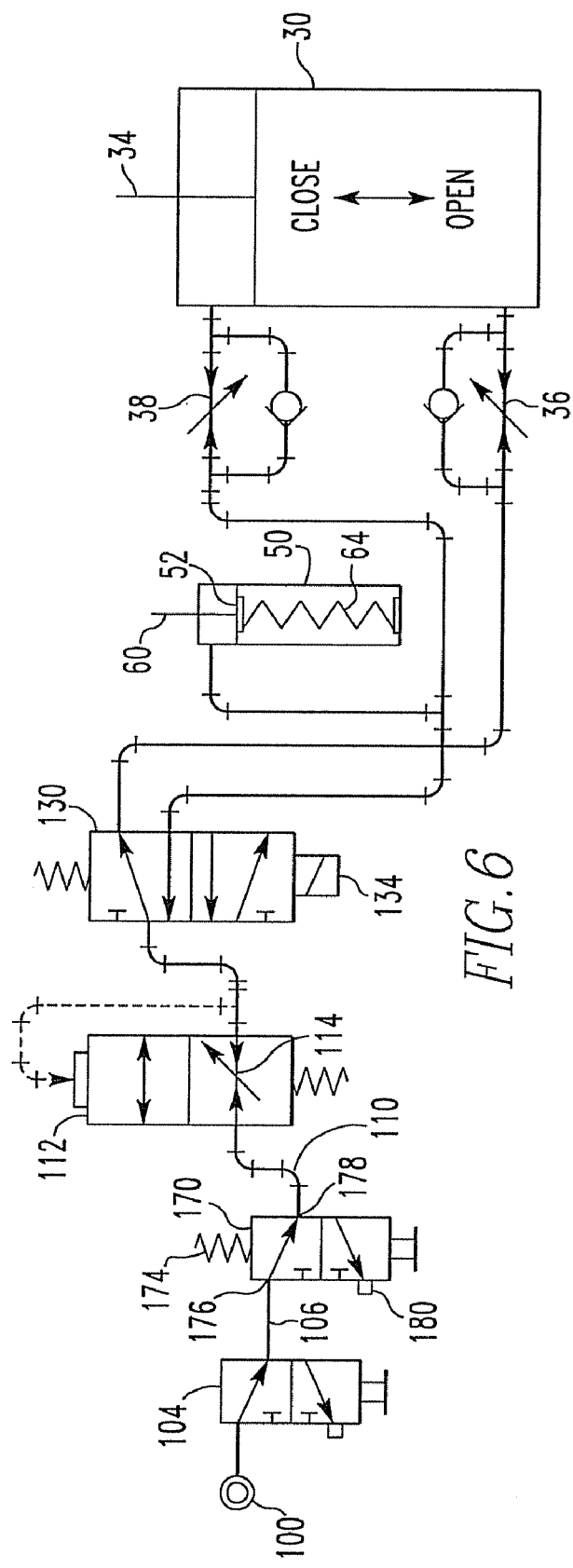
FIG. 6 is a schematic diagram of the control system arrangement.

In the preferred embodiment of FIGS. 5 and 6, the fluid pressure interruption means 170 is a three-way valve 170. As best illustrated in FIG. 6, valve 170 is biased by a spring 174 for connection to the fluid pressure line 106 for enabling fluid pressure 100 to flow through the inlet port 176 and through the outlet port 178 to the slow start valve 112. An actuation means 172, such as a pushbutton, is provided for engagement with the at least one actuation portion 144. An exhaust port 180 is provided for opening of the door 2 in an emergency condition by exhausting fluid pressure from the line 110 into an atmosphere, thus discharging the fluid pressure 100 from the drive cylinder 30.

In the embodiment illustrated in FIG. 4, such at least one actuation portion 145 and such at least one attachment means 160 are disposed within the second blocking means 70.

Those skilled in the art will readily understand that such fluid pressure interruption means 170 (FIGS. 3 and 4) may be a well known electrical switch 170, interacting with an actuation portion 145 of the second blocking means 70, such as pushbutton or a lever 172. When activated, the switch 170 will provide an electrical signal to the control system (not shown) of the transit vehicle which then will switch the control valve 130 (FIG. 6). Yet alternatively, such fluid pressure interruption means 170 could be a sensor 170 of an optical, proximity or magnetic Hall effect type sensing the actuation portion 144 (FIG. 3), 145 (FIG. 4) of the second blocking means 70.

Those skilled in the art will further understand that activation of cable 9 will overcome resistance of the first biasing means 64 of blocking means 50 and biasing the blocking member 61 (FIG. 3), 62 (FIG. 4), 63 (FIG. 5) in the locking direction and will discharge the fluid pressure 100 from the drive cylinder 30 thus enabling manual opening of the door 2.

In the most preferred embodiment of the present invention, as best illustrated in FIG. 5, the unlock mechanism 146 includes an unlock means (lever) 150 pivotally attached to the mounting member 44 at a fourth pivot 152 which has a first portion 154 for engagement with an unlocking portion 78 of the second blocking means 71 (bell crank) that is driven by blocking member 63. At least one actuation portion 156 is adapted for activating the fluid pressure interruption means 170. The unlock means 150 is biased in a locking direction against a stop 164 by a second biasing means 162 disposed about the fourth pivot 152. Preferably, such second biasing means 162 is a bias spring 162.

A manual release means coupled to the rotary door operator 10 is provided for manual release of the lock mechanism 42 in an emergency situation or for operational and maintenance purposes when the fluid pressure 100 is not available.

In the preferred embodiment, the manual release means is at least one cable 9 routed within the transit vehicle structure 8 for remotely initiating manual opening of the door 2. Such cable 9 is secured to least one attachment means 160 provided in a second portion 158 of the unlock means 150.

At least one guiding means 188 preferably attached to a guiding bracket 186 is provided for attachment and guiding of the cable 9 at a rotary door operator 10. Such at least one guiding means 188 is configured for receiving the cable 9 of a predetermined configuration. It will be understood that in such arrangement the cable 9 is secured to the rotary door operator 10 and is guided adjacent its termination at the at least one attachment means 160.

Those skilled in art will readily understand that routing of the cable 9 from the bottom portion of the door 2 can be easily accommodated by modifying the unlocking portion 78 of the second blocking means 71 to be disposed above the first portion 154 of the unlock means 150. Such arrangement will enable the second blocking means 71 to move in the unlocking direction upon movement of the cable 9.

Figure 7A:
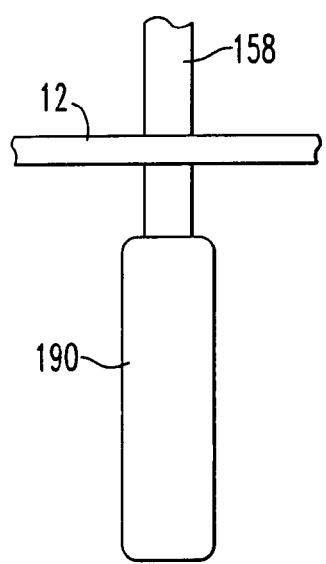
FIG. 7a is a plan view of a straight handle.
Figure 7B:
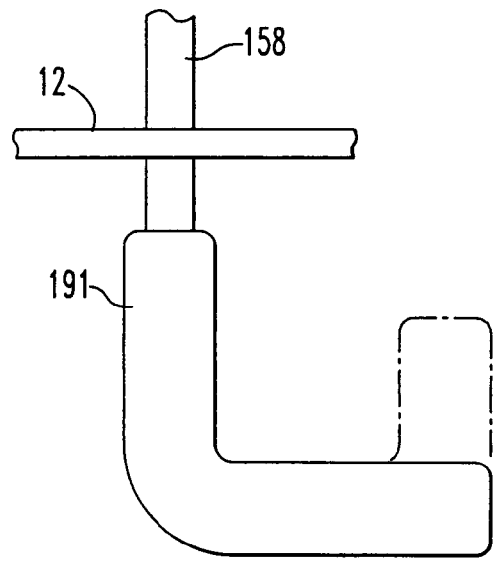
FIG. 7b is a plan view of an L-type or U-type handle.
Figure 7C:
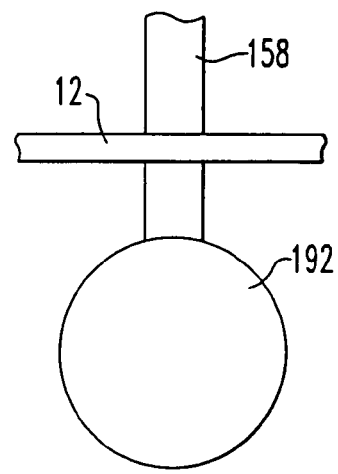
FIG. 7c is a plan view of a ball-type handle.
Figure 7D:
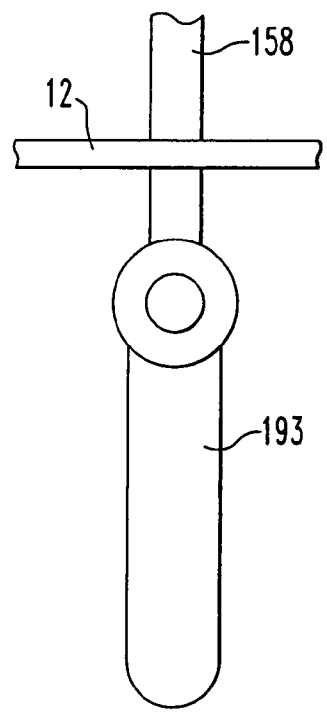
FIG. 7d is a plan view of a hinged-type handle useful in the practice of this invention.

To enable versatility of manual door opening such manual release means may be a handle 190 of various types including but not limited to those illustrated in FIGS. 7a-7d which is coupled to the second portion 158 of the unlock means 150. The handle 190 extends beyond the cover 12 for manual rotation of the unlock means 150. In a particular reference to FIG. 7a, there is illustrated a lever straight handle 190 which is really an extension of the second portion 158. An L-type or U-type handle 191 is illustrated in FIG. 7b, while a ball-type handle 192 is illustrated in FIG. 7c. The handle 193 may be also hinged as illustrated in FIG. 7d to enable its stowage adjacent a cover 12 of the rotary operator 10 when such handle 190 is not in use. It will be understood that the cover 12 will be adapted with an access means to accommodate handles of a predetermined type.

In a particular reference to FIG. 6, a valve 170 of the most preferred embodiment is disposed in a fluid pressure line intermediate a supply valve 104 and a control valve 130. Operation of the cable 9 or handle 190 will overcome the resistance of the first biasing means 64 with the at least one actuation portion 144 activating valve 170 which will cause discharge of the fluid pressure 100 from the cylinder 30 enabling downward movement of the output shaft 22 and, more particularly, enabling manual rotation of the door 2 in an opening direction.

In applications employing an electrical solenoid as a first blocking means 50, an electrical signal that is required to activate solenoid 134 of the control valve 130 will be adapted to power electrical solenoid during door 2 opening cycle.

While the presently preferred and alternative embodiments of the instant invention have been described in detail above in accordance with the patent statutes, it should be recognized that various other modifications and adaptations of the invention may be made by those persons who are skilled in the relevant art without departing from either the spirit of the invention or the scope of the appended claims.

The invention claimed is:

1. An unlock mechanism for a rotary door operator for opening and closing a door of a transit vehicle door system, said rotary door operator having locked and unlocked positions, said rotary door operator having a mounting bracket with a first surface portion for attachment to a structure of a transit vehicle and a second surface portion, a drive cylinder enabled by a source of fluid pressure, an output shaft connected to a piston of said drive cylinder for reciprocal movement therewith, an abutment secured to said output shaft for axial movement therewith; said unlock mechanism comprising:
   (a) a blocking actuator;
   (b) a blocking member reciprocated by said blocking actuator, said blocking member disposed at a predetermined distance from a bottom surface of said abutment secured to said output shaft when said blocking member is in a locked position and said door is closed;
   (c) a pivoted blocking stop pivotally disposed on said second surface portion of said mounting bracket, said pivoted blocking stop having an abutment surface for abutting said abutment secured to said output shaft, said pivoted blocking stop being rotatable to an overcenter locked position by said blocking member and said blocking actuator, said blocking stop in the overcenter locked position abutting when the door is closed said bottom surface of said abutment such that the weight of the door holds the pivoted blocking stop in the overcenter locked position preventing a lowering axial movement of said output shaft, said pivoted blocking stop being rotatable to an unlocked position by said blocking actuator and said blocking member for enabling said lowering axial movement of said output shaft to open said door;
   (d) a biasing means engageable with said blocking actuator for urging said blocking member toward said locked position and said blocking stop toward said overcenter locked position;
   (e) at least one means for fluid pressure interruption having an interruption for discharging said fluid pressure from said drive cylinder during a manual opening of said door, said at least one fluid pressure interruption means actuating means for engagement with said pivoted blocking stop; and
   (f) a manual release means secured to said blocking stop for rotating said blocking stop from said locked position which causes said blocking stop to engage said interruption actuating means.

2. The unlock mechanism for a rotary door operator according to claim 1 wherein said blocking actuator is one of a cylinder and a solenoid.

3. The unlock mechanism for a rotary door operator according to claim 1 wherein said blocking actuator comprises a cylinder connectable to said source of fluid pressure, a piston biased toward a locking direction by said biasing means, said piston movable in an unlocking direction by said fluid pressure, and a shaft attached to said piston at one end thereof and to said blocking member at the other end thereof.

4. The unlock mechanism for a rotary door operator according to claim 3 wherein said fluid pressure is one of pneumatic and hydraulic.

5. The unlock mechanism for a rotary door operator according to claim 1 wherein said at least one fluid pressure interruption means is one of a valve and a switch.

6. The unlock mechanism for a rotary door operator according to claim 5 wherein said switch is a sensor selected from the group consisting of optical, proximity and Hall effect.

* * * * *

UNITED STATES PATENT AND TRADEMARK OFFICE
CERTIFICATE OF CORRECTION

PATENT NO. : 7,654,040 B2  Page 1 of 1
APPLICATION NO. : 11/784953
DATED : February 2, 2010
INVENTOR(S) : Tong et al.

It is certified that error appears in the above-identified patent and that said Letters Patent is hereby corrected as shown below:

Title Page, See Item (75) Inventors, "Haibo Tong, Palapine, IN (US)" should read
-- Haibo Tong, Palatine, IL (US) --

Column 8, Line 11, Claim 1, after "abutting", delete "when the door is closed"
Column 8, Line 12, Claim 1, after "abutment", insert -- when the door is closed --

Column 8, Line 24 up to and including Line 29 should read:

-- (e) at least one means for fluid pressure interruption for discharging said fluid pressure from said drive cylinder during a manual opening of said door, said at least one fluid pressure interruption means having an interruption actuating means for engagement with said pivoted blocking stop; and --

Signed and Sealed this

Eighth Day of June, 2010

David J. Kappos
*Director of the United States Patent and Trademark Office*